3,661,900
2-(2′,6′-DICHLOROPHENYL)-1,3-THIAZINE-4-ONE
Jasper Daams and Kobus Wellinga, Weesp, Netherlands, assignors to U.S. Philips Corporation, New York, N.Y.
No Drawing. Filed June 3, 1970, Ser. No. 43,194
Claims priority, application Netherlands, June 4, 1969, 6908457
Int. Cl. C07d 93/06
U.S. Cl. 260—243 R             1 Claim

ABSTRACT OF THE DISCLOSURE

It has been found that 2-(2′,6′-dichlorophenyl)-1,3-thiazine-4-one has a biocidal effect on plants and their seeds. An interesting feature is that the said novel substance has not only a good initial activity but also a long-term activity. Selective use of the substance in cultivated plants having roots which penetrate to a comparatively great depth is possible. Thus, no appreciable damage is done to the cultivated plants.

---

2-(2′,6′-dichlorophenyl) - 1,3 - thiazine-4-one, methods of producing the said substance and preparations containing it as an active ingredient.

It has been found that 2-(2′,6′-dichlorophenyl)-1,3-thiazine-4-one, which compound can be represented by the formula

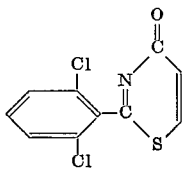

exerts a strong influence on the growth of plants. In particular it has been found that the compound according to the invention is capable of killing or heavily damaging a large variety of plants and their seeds.

The biologic evaluation research underlying the invention has shown that the herbicidal activity of the compound according to the invention is characterized by a strong initial effect and also by prolonged duration of its activity.

In the practical use of the compound according to the invention, the said highly advantageous and surprising biologic characteristic results in interesting advantages over other herbicidal compounds which either have satisfactory initial activity or prolonged activity, for owing to the strong initial activity good results are soon observed and in addition any renewed infection with undesirable plants, which will otherwise occur after some time, is prevented.

It has further been found that the physical qualities also of the substance according to the invention are highly advantageous for its use in practice, for the compound according to the invention has a low rate of evaporation and does not co-distill with water, which in many forms of application of biocidal substances is frequently used.

The above implies that the compound according to the invention can be used under widely different weather conditions and in climatologically widely different regions, while furthermore there is no need for overdosing because of evaporation losses.

It has further been found that the compound according to the invention is bound comparatively strongly to the organic material present in the soil and is not carried along to the subsoil by rain-water and ground water. Thus, the activity of the substance according to the invention is restricted to plants which are rooted in the upper soil layers, such as weeds.

This permits selective use of the compound according to the invention. The selectivity on the basis of differences in root depth permits a weed control in plants the roots of which penetrate deeper such as, for example, vines, fruit trees, citrus trees, decorative shrubs and further woody plants and trees.

The use in cereals depends upon the stage of growth. In not too young cereal plants the substance according to the invention can be used without the plants being appreciably damaged.

The afore-mentioned low rate of evaporation of the substance according to the invention is of particular importance also in the selective use of the substance in cultivated plants, for the low evaporation rate prevents the occurrence above the ground of the vapour phase of the substance in a concentration high enough to damage the cultivated plants through leaf absorption of the biocidal compound.

The toxicity of the compound according to the invention to both monocotyledonous and dicotyledonous plants and their seeds has been found in a number of experiments in which various cultivated and weed plants, including water-plants, were treated with the compounds according to the invention in amounts varying from 0.5 kg. to 10 kg. of active material per ha.

The tests comprised both post-emergence and pre-emergence treatments.

The results showed that amongst other weeds the following ones can be effectively controlled at very low dosages such as 0.5 kg. per hectare: chickweed, corn spurry, stinging nettle, groundsels, slender foxtail, cleavers, black bindweed, orach, frenchweed, nightshade, white mustard, annual poa, millet, common garden cress, amaranth, spotted persicary and salvinia.

The substances according to the invention can advantageously be used for controlling undesirable plant growth by virtue of its above-mentioned biologic activities. It enables selective control of weeds in cultivated plants.

For this purpose the compound according to the invention is worked up into the usual herbicidal such as dusts, wettable powders, miscible oils, invert emulsions, oil solutions, oil dispersions, granules, fumigating candles and aerosol preparations.

In all these preparations the active substance is mixed with, or dissolved or dispersed in, a solid or liquid carrier, if required in the presence of auxiliary substances, for example, surface-active substances, adhesives, binders, lubricants and disintegrating agents. Wettable powders and miscible oils are preparations in concentrated form which are diluted with water before, or during, use.

The invert emulsions are mainly used in aerial applications, large areas being treated with comparatively small amounts of preparation. The invert emulsion can be prepared in the spraying apparatus shortly before, or even during, spraying by emulsifying water in an oil solution or an oil dispersion of the active substance. Hereinafter a few forms of preparations will be described more fully, and it should be noted that one skilled in the art the production of these and similar known preparations will not present difficulties.

Granular preparations are made, for example, by taking up the active substance in a solvent and impregnating granular carrier material, such as porous granules (for example pumice or attaclay), mineral non-porous granules (sand or ground marl) and organic granules (for example dried coffee grounds and cut tobacco leaf stems) with the said solution, if required in the presence of a binder.

A granular preparation may alternatively be manufactured by compressing the active substance together with powdered minerals in the presence of lubricants and binders and by comminuting and straining the compressed material to the desired grain size.

Dusts are obtainable by intimately mixing the active substance with an inert solid carrier material, for example, in a concentration of from 1% to 50% by weight. Examples of suitable solid carrier materials are: talcum, kaolin, pipeclay, diatomaceous earth, dolomite, gypsum, chalk, bentonite, attapulgite and colloidal $SiO_2$ or mixtures of these and similar substances. Also, organic carrier materials such as, for example, ground walnut shells may be used.

Wettable powders are produced by mixing from 10 to 80 parts by weight of the solid inert carrier such as, for example, the above-mentioned carrier materials with from 10 to 80 parts by weight of the active substance, from 1 to 5 parts by weight of the dispersing agent such as, for example, the lignin sulphonates or alkylnaphthalene sulphonates known for this purpose, and preferably also with from 0.5 to 5 parts by weight of a wetting agent, such as fatty alcohol sulphates, alkyl aryl sulphonates or fatty acid condensation products, for example those known under the trademark Igepon.

For the manufacture of miscible oils the active substance is dissolved, or finely divided, in a suitable solvent which preferably is poorly miscible with water, an emulsifier being added to this solution. Suitable solvents are, for example, xylene, toluene, high-aromatic petroleum distillates, coal solvent naphtha, distilled tar oil and mixtures of these liquids. Suitable emulsifiers are, for example, alkylphenoxypolyglycolethers, polyoxyethylene-sorbitan esters of fatty acids or polyoxyethylene-sorbitol ester of fatty acids. The concentration of the active compounds in these miscible oils is not restricted within narrow limits and may vary between 2% and 50% by weight. In addition to a miscible oil there may be mentioned as a liquid and highly concentrated primary composition a solution of the active substance in a satisfactorily water-miscible liquid, for example, acetone, to which solution a dispersing agent and, as the case may be, a wetting agent is added. Diluting this product with water shortly before, or during spraying, results in an aqueous dispersion of the active substance.

An aerosol preparation according to the invention is obtained in the usual manner by incorporating the active substance, if required in the form of a solution, in a volatile liquid which may be used as a propellant such as, for example, the mixture of chlorine-fluorine derivatives of methane and ethane commercially available under the trademark "Freon."

Fumigating candles or fumigating powders, i.e. preparations which are capable of producing a pesticidal smoke when burned, are obtained by taking up the active substance in a combustible mixture, which may contain, preferably ground sugar or wood as a fuel, a substance to sustain combustion such as, for example, ammonium nitrate or potassium chlorate, and furthermore a substance to retard combustion, for example kaoline, bentonite and/or colloidal silicic acid.

In addition to the above-mentioned ingredients the preparations according to the invention may contain other substances known for use in preparations of this type.

Thus, there may be added to a wettable powder or to a mixture to be granulated a lubricant such as calcium stearate or magnesium stearate. Furthermore "adhesive," such as polyvinylalcohol-cellulose derivatives, or other colloidal materials, such as casein, may be added to improve the adherence of the pesticide to the surface to be protected.

The preparations according to the invention may also include at least one other biologically active substance, preferably a herbicide or a substance which influences growth.

This ensures that the activity spectrum of the preparations according to the invention is expanded and synergistic effects are obtained.

The following known biologically active compounds are suitable for use in the combination preparations according to the invention.

Herbicidal compounds having growth-promoting effects such as:

2,4-dichlorophenoxy-acetic acid (2,4-D),
2,4,5-trichlorophenoxy-acetic acid (2,4,5-T),
2-methyl-4-chlorophenoxy-acetic acid (MCPA),
α-(2-methyl-4-chlorophenoxy)-propionic acid (MCPP).

Quaternary herbicides such as:

1,1'-ethylene-2,2'-dipyridylium-dibromide (diquat),
1,1'-dimethyl-4,4'-dipyridylium-dibromide (paraquat).

Triazines such as:

2-chloro-4,6-bisethylamino-s-triazone (simazine),
2-chloro-4-ethylamino-6-isopropylamino-s-triazone (atrazine),
2-chloro-4,6-bisisopropylamino-s-triazone (propazine).

Urea derivatives such as:

1-phenyl-3,3-dimethylurea (fenyron),
1-(4'-chlorophenyl)-3,3-dimethylurea (monuron),
1-(4'-chlorophenyl)-3-methoxy-3-methylurea (monolinuron),
1-(4'-chlorophenyl)-3-[3-(butyne-1)]-3-methylurea (buturon)
1-(4'-bromophenyl)-3-methoxy-3-methylurea (metobromuron),
1-(3',4'-dichlorophenyl)-3,3-dimethylurea (diuron),
1-(3',4'-dichlorophenyl)-3-methoxy-3-methylurea (linuron),
1-(3',4'-dichlorophenyl)-3-butyl-3-methylurea (neburon),
1-(3'-chloro-4'-bromophenyl)-3-methoxy-3-methylurea (C 6313),
1-(3'-trifluoromethylphenyl)-3,3-dimethylurea (fluometuron).

Phenols such as:

2,6-dichloro-4-cyanophenol (chloroxynil),
2,6-dibromo-4-cyanophenol (bromoxynil),
2,6-dijodo-4-cyanophenol (ioxynil),
4,6-dinitro-orthocresol (DNOC),
2-sec.-butyl-4,6-dinitrophenol (dinoseb),
pentochlorophenol (PCP).

Chloronated fatty acids such as:

monochloroacetic acid (SMCA),
trichloroacetic acid (TCA),
α,α-dichloropropionic acid (dalapon),
α,α,α-trichloropropionic acid (TCP).

Mixed-type compounds:

3-amino-1,2,4-triazole (amitrol),
3,6-endoxo-hexahydrophthalic acid (endothal),
maleic acid hydrazide (MH),
2,3,6-trichlorobenzoic acid (TBA),
2-methoxy-3,6-dichlorobenzoic acid (dicamba),
1-(3',4'-dichlorophenyl)-3-methyl-2-pyrrolidinone (BV 201),
1-(3'-chloro-4'-methylphenyl)-3-methyl-2-pyrrolidinone (BV 207),
N,N-dimethyl-2,2-diphenylacetonide (diphenamide),
2,3,5-trichloropyridon-4 (daxtron),
4-amino-3,5,6-trichloro-α-picolinic acid (tordon),
5-amino-4-chloro-2-phenyl-3(2H)-pyridazium (Pyramin),
3-cyclohexyl-5,6-trimethylene uracil (lenacil),
2,6-dinitro-N,N-dipropyl-a,a,a-trifluoro-p-toluidine trifluralin
2,6-dinitro-4-methylsulphonyl-N,N-dipropylaniline (Planadin),
5-bromo-6-methyl-3-(1-methylpropyl) uracil (bromacil),
3-amino-2,5-dichlorobenzoic acid (amiben),
2,3,6-trichlorophenylacetic acid (fenac), 2,6-dichloro-3-methoxybenzoic acid (mediben),
N-(3-chlorophenyl)-isopropylcarbamate (CIPC),
2,6-dichlorobenzonitrile (dichlobenil).

It should furether be pointed out that the preparations according to the invention when used for selective control of weeds in plants may additionally contain a fertilizer.

The dosage of the preparation according to the invention depends on various factors, such as the form of preparation chosen, the type of weeds to be controlled and the stage of growth of the cultivated plants. In general, good results will be obtained by using a dosage which corresponds to from 0.5 to 10 kg. of active substance per hectare.

The compound according to the invention is a novel substance and may be produced by a method known for similar substances or by any suitable method. Thus, the compound according to the invention may be obtained by reacting 2,6-dichloro-thiobenzamide in the presence of a solvent with a compound of the formula

HC≡C—COOR where R is a hydrogen atom or a lower alkyl group containing from 1 to 6 carbon atoms.

Suitable solvents are aromatic hydrocarbons such as benzene and toluene, chlorinated hydrocarbons such as dichloromethane, carbontetrachloride and trichloroethylene, ethers such as diethylether, alcohols such as ethanol and propanol, ketones such as acetone and further acetonitrile.

The reaction temperature may vary between room temperature and the boiling point of the solvent used.

In a preferred embodiment the reaction is carried out with propargylic acid, absolute ethanol or benzene being used as a solvent.

The invention will now be described more fully with reference to the following examples.

(I) Production of 2 - (2',6'-dichlorophenyl) - 1,3-thiazine-4-one.—41.2 g. of 2,6-dichlorothiobenzamide and 14.0 g. of propargylic acid are added to 300 ml. of absolute ethanol. After standing at room temperature for 1.5 hours the reaction mixture is boiled for 2.5 hours, after which the solvent is largely distilled off. Aafter standing overnight the solid substance obtained after the addition of 150 ml. of ether is drawn off and washed with ether. Yield 37 g. Melting point 175° C.

(II) Production of 2-(2',6' - dichlorophenyl)-1,3-thiazine-4-one.—20.6 g. of 2,6-dichlorothiobenzamide and 9.0 g. of propargylic acid are boiled in 200 ml. of benzene for 1 hour, water separating off after a comparatively short time. The benzene is distilled off, whereupon the above procedure is repeated, using 250 ml. of benzene. After the addition of ether the solid substance is drawn off. Yield 19.5 g. Thin-layer chromotography shows that the substance is substantially pure. Melting point 180° C.

What is claimed is:
1. A compound of the formula

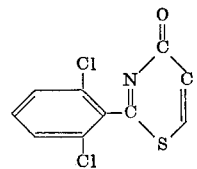

References Cited
UNITED STATES PATENTS 3,445,460   5/1969   Bourdais _____ 260—243

JOHN M. FORD, Primary Examiner

U.S. Cl. X.R.

71—90